C. FRANK.
BELT RIVET.

No. 63,497. Patented Apr. 2, 1867.

Witnesses:
H. C. Weller
Samuel Knight

Inventor:
Conrad Frank
By Knight Bros.
Attorneys

United States Patent Office.

CONRAD FRANK, OF CINCINNATI, OHIO.

*Letters Patent No. 63,497, dated April 2, 1867.*

IMPROVED BELT RIVET.

*The Schedule referred to in these Letters Patent and making part of the same.*

TO WHOM IT MAY CONCERN:

Be it known that I, CONRAD FRANK, of Cincinnati, in the county of Hamilton, and State of Ohio, have invented a certain new and useful Belt Rivet; and I hereby declare the following to be a full, clear, and exact description thereof, reference being had to the accompanying drawings, making a part of this specification.

My invention relates to a belt rivet in two parts, the same being held together by the act of screwing the one into the other. In the accompanying drawing—

Figure 1:
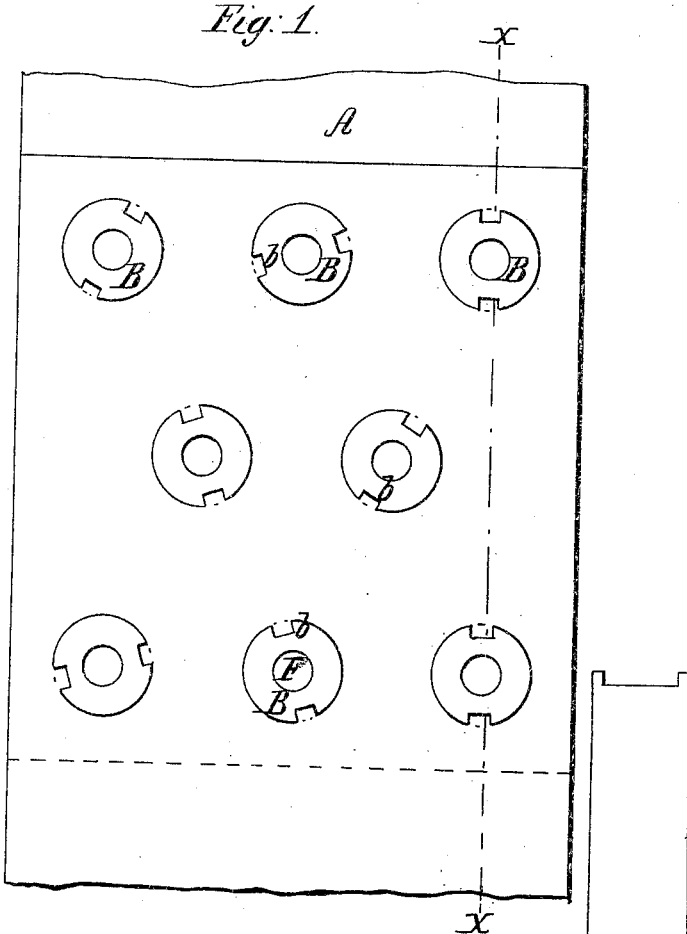
Figure 1 represents a joint of leather belting secured by my rivet.
Figure 2:
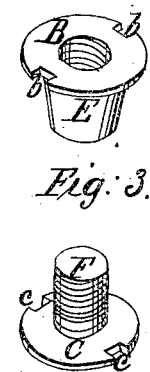
Figure 2 represents a section of the same, taken at the line X X.
Figure 3:
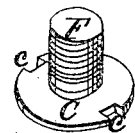
Figure 3 is a perspective view of the rivet detached.
Figure 4:
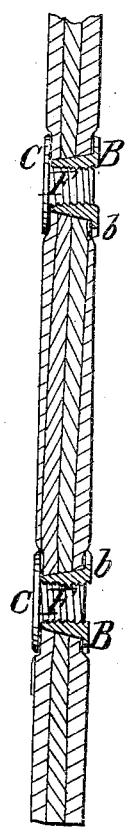
Figure 4 is the key by which the rivet is screwed tight.

A represents the leather or gum-elastic of which the belt is composed; B the socket head of the rivet; and C the other head carrying the male screw. The heads B C have slots, $b\ c$, to enable the screwing of the rivets up by an appropriate key, D. E represents the conical part of the rivet, being the part which comes in contact with the leather. My rivet possesses great advantages over that almost universally in use in efficiency, convenience, and even in economy. All persons acquainted with the use of belting know that when new belts are put on the stretching of the leather makes it necessary that they should be frequently tightened, which is done by making a fresh joint, which, as the ordinary rivet cannot at all readily be made to give way, is done by cutting the belt directly through, and then making two joints, one on each side of the cut, or by lacing with a leather thong, which both weakens the belt, and from continual attrition the lace is liable to wear out. This also leaves the belt too short for a permanent joint whenever it is desired to make it; but with my rivet the necessity of a double joint is obviated, as it is only necessary to unscrew the rivets and to increase the lap of the joint. Economy is greatly subserved in this, that my rivet can be used any number of times, whereas the ordinary rivet, necessarily of pure copper, (to admit of riveting in the soft leather,) and therefore somewhat expensive, can be used but once; and when the destruction of leather which takes place in shortening the belt is taken into account, my iron screw rivet will be found much the cheaper of the two. Another great advantage possessed by my rivet consists in the convenience of making it fast, being much more than in the ordinary method of riveting, as requiring but one operator even in the most inconvenient situations, and no tools but a puncturer and key, D. Although my rivet may be so easily made fast or loosened again by the proper key, it is almost impossible that it should give way by accident, as the slots $b\ c$, in the heads B and C, allowing the leather to press up through them to some extent, will operate as an anchor to forbid rotation. Another advantage consists in the conical form of my shank, E; the perforations in the leather being made the size of its smaller diameter, as the shank enters it will become tightened and bind much firmer than a rivet without such arrangement.

I am aware that a belt fastening has before been made with an internally threaded sleeve, and a male screw fitting therein, to be used in connection with metal plates, between which the ends of the belt are separately clamped. The advantages of my invention over the above are that the screw-bolts are formed with flanged heads to avoid the necessity of using separate clamping plates; and secondly, that the threaded sleeve is tapered on its outside, so that when inserted in an aperture of its smallest diameter, and drawn in by the action of the screw, it binds the leather as securely as if clamping plates were used.

What I claim, and desire to secure by Letters Patent, is—

The combination of the internally threaded conical sleeve E, the screw F, and the two flange heads B C, all constructed as and for the purposes herein shown and described In testimony of which invention I hereunto set my hand.

CONRAD FRANK.

Witnesses:
GEO. H. KNIGHT,
JAMES H. LAYMAN.